US005559402A

United States Patent [19]
Corrigan, III

[11] Patent Number: 5,559,402
[45] Date of Patent: Sep. 24, 1996

[54] POWER CIRCUIT WITH ENERGY RECOVERY FOR DRIVING AN ELECTROLUMINESCENT DEVICE

[75] Inventor: George H. Corrigan, III, Corvallis, Oreg.

[73] Assignee: Hewlett-Packard Company, Palo Alto, Calif.

[21] Appl. No.: 296,194

[22] Filed: Aug. 24, 1994

[51] Int. Cl.$^6$ .............................. G09G 3/30; H05B 37/00
[52] U.S. Cl. ...................... 315/169.3; 315/205; 315/226; 345/76; 345/211; 340/825.81
[58] Field of Search ............................ 315/169.1, 169.3, 315/169.4, 205, 226; 345/77, 78, 79, 80, 211, 212, 213, 76, 208, 209; 340/825.81

[56] References Cited

U.S. PATENT DOCUMENTS

| | | | |
|---|---|---|---|
| 4,527,096 | 7/1985 | Kindlmann | 315/169.3 |
| 4,859,911 | 8/1989 | Kinnard et al. | 315/169.3 |
| 4,864,182 | 9/1989 | Fujioka | 315/169.3 |
| 5,227,696 | 7/1993 | Asars | 315/169.3 |

FOREIGN PATENT DOCUMENTS

| | | | |
|---|---|---|---|
| 0359245 | 3/1990 | European Pat. Off. | H05B 33/08 |
| 0420518 | 4/1991 | European Pat. Off. | H05B 33/08 |
| 0487732 | 6/1992 | European Pat. Off. | H05B 33/08 |
| 0508337 | 10/1992 | European Pat. Off. | H05B 33/08 |

OTHER PUBLICATIONS

TEL Timex Electroluminescence specification and application note; May 20, 1993.

"Energy Recovery in EL Drive Systems," Jung, C. C., Gielow, T. A. SPIE vol. 624; Advances in Display Technology VI (1986).

"New Energy Recovery Sustain Circuit for the AC Plasma Display" Weber, L. F., Wood, M. B.; SID 87 Digest (1987).

"A Low-Power Drive Scheme for AC TFEL Displays;" Higgins, M. L.; SID 85 Digest; (1985).

"Power Supply for Electroluminescence Aiming Integrated Circuit" Ueno, F., Inoue, T., Oota, I., Harada, I.; IEEE (1992).

Primary Examiner—Robert Pascal
Assistant Examiner—Arnold Kinkead

[57] ABSTRACT

A drive circuit for an EL device defines a power cycle and performs energy recovery. During a charging phase of the power cycle, a first energy storage device (i.e., inductor) sequentially releases small energy portions from a power source into the EL device. The energy portions incrementally accumulate to create a high energy potential across the EL device. During a discharging phase of the power cycle, a second energy storage device (i.e., inductor) sequentially accepts small energy portions from the EL device to decrementally discharge the EL device. A switching scheme is implemented to pump the energy storage devices to sequentially release or accept the small energy portions. Energy recovery is performed by capturing some of the EL device discharge energy and introducing it back to the EL device during a subsequent charging phase.

12 Claims, 3 Drawing Sheets

POWER CIRCUIT WITH ENERGY RECOVERY FOR DRIVING AN ELECTROLUMINESCENT DEVICE

BACKGROUND OF THE INVENTION

This invention relates to a circuit for driving an electroluminescent ("EL") device, and more particularly to a drive circuit which charges an EL device during one part of a power cycle and recovers EL device discharge energy during another part of the power cycle. The recovered energy then is re-applied to charge the EL device.

A typical electroluminescent device is a flat-panel display. The panel is formed by an electroluminescent layer sandwiched between a pair of outer conductive layers. The electroluminescent layer is formed by a ceramic dielectric having an electroluminescent phosphor coating. The outer conductive layers form horizontal and vertical electrodes on opposite sides of the dielectric. Activation of crossing electrodes illuminates the intersected phosphor area to light a pixel on the display.

In operation a pixel is activated by repetitive charging and discharging of the panel area defining the pixel. The panel in essence is a capacitive device typically modelled as a capacitor having a nonlinear loss element. The loss element varies with voltage and switching frequency. Conventional electroluminescent devices lacking energy recovery schemes consume large amounts of energy through repetitive charging and discharging and exhibit relatively low power conversion efficiency.

During a charging phase the panel absorbs energy as capacitance. Then during a discharge phase, the capacitive energy is discharged through a resistive device to be dissipated in the form of heat. During the charging phase, only a very small portion (e.g., less than 5%) of the energy delivered to the panel is expended in the creation of light. Most of the energy is stored in the panel capacitance or dissipated in the charging path resistance as heat. Accordingly there has been a need to improve the efficiency of electroluminescent panels and reduce power consumption.

Schemes for improving the efficiency include energy saving schemes and energy recovery schemes. Energy saving schemes have been directed toward shaping the charging current so as to reduce the energy lost as heat through the charging path resistance. This invention is directed toward a drive circuit employing an energy recovery scheme.

According to energy recovery schemes, energy discharged by the EL device is forced back into a system power source. To do so a portion of the discharged energy typically dissipated through a resistive device, instead, is directed elsewhere for storage and re-use. Prior energy recovery schemes have directed the energy into a "resonant tank" circuit. The EL device discharged in one burst based on the load capacitance timing constant. A drawback of such approach is that large components are required to move and capture the energy. Accordingly there is a need for an alternative energy recovery scheme in which smaller components can be used. Smaller low-profile components are desirable for implementing a drive circuit with power recovery in hand-held EL devices.

SUMMARY OF THE INVENTION

According to the invention, a drive circuit for an EL device defines a power cycle and performs energy recovery. During a charging phase of the power cycle, a first energy storage device (i.e., inductor) sequentially releases small energy portions from a power source into the EL device. The energy portions incrementally accumulate to create a high energy potential across the EL device. Some of the energy is converted to light by the EL device. During a discharging phase of the power cycle, a second energy storage device (i.e., inductor) sequentially accepts small energy portions from the EL device to decrementally discharge the EL device.

A switching scheme is implemented to pump the energy storage devices to sequentially release or accept the small energy portions. The size (i.e., inductance and physical size) of the energy storage devices determines the amount of energy to be moved per switching step. By moving small energy portions in many steps, instead of one large energy portion in a single burst, the size of the energy storage devices used is reduced.

Energy recovery is performed by capturing some of the EL device discharge energy and introducing it back to the EL device during a subsequent charging phase. To capture the discharge energy, the small energy portions accepted by the second energy storage device are passed to a third energy storage device (i.e., capacitor) which accumulates the portions. The third energy storage device introduces the recovered energy back into the EL panel by discharging into the EL device during a subsequent charging phase. This partially charges the EL device. To completely charge the EL device, additional energy is pumped from the power source via the first energy storage device to the EL device. As previously described, the additional energy is released in the form of small energy portions to incrementally accumulate a high energy potential across the EL device.

The Drive circuit is formed by a pair of switching bridges and a pair of pumping circuits. The pumping circuits include the energy storage devices.

According to one aspect of the invention, the bridges are formed as a first and a second bridge across the EL device. Switching action among transistors forming the bridges defines a power cycle. When the first bridge is active, energy flow into the EL device is at one polarity. When the second bridge is active, energy flow into the EL device is at the opposite polarity. When neither bridge is active, the EL device is isolated. Within each bridge, switching transistors are controlled to define either one of a charging phase or a discharging phase. The bridges are controlled to alternate polarity and alternate charging and discharging phases. A repeating power cycle occurs in which a charging phase and discharging phase at one polarity are followed by a charging phase and discharging phase at the opposite polarity.

According to another aspect of the invention, an input voltage signal from a power source is received into a first pump stage of the drive circuit. The first pump stage includes an inductor for storing energy from the power source and a switching device for pumping the energy from the inductor to the EL device. The switching device switches at a high frequency relative to the EL panel charging time, constant so that flow of many small portions of energy defines the charging phase. The first pump stage is active during charging phases to move a sequence of small energy portions from the power source to the EL device via the inductor.

According to another aspect of the invention, the drive circuit includes a second pump stage which receives the discharge from the EL panel during a discharge phase. The second pump circuit includes an inductor, a recovery capacitor and a switching device. The switching device activates a discharge path for the EL device. While the path is active a small portion of discharge energy flows into the inductor. The switching device controls the discharge path so that discharge energy is pumped in small portions from the EL device to the inductor and through the inductor into the recovery capacitor for storage. The switching device switches at a high frequency relative to the EL panel discharge timing constant so that flow of many small portions of discharge energy defines the discharging phase. The second pump stage is active during the discharge phases to recover portions of discharged energy at the recovery capacitor.

The recovery capacitor subsequently discharges the recovered energy into the EL device during the next charging phase of the power cycle. Thus, during each charging phase, the EL device receives a relatively large energy portion from the recovery capacitor and multiple small energy portions from the primary power source. The energy from the recovery capacitor is recovered energy which need not be drawn off the power source. Thus, power consumption is reduced.

According to another aspect of the invention, the switching action in the two pump stages and the two bridges are coordinated to define the power cycle. The switch in the first pump stage is active for switching only during charging phases to pump energy into the EL device. The switch in the second pump stage is active for switching only during discharge phases to pump energy out of the EL device. The transistors in the first bridge are active to define a first polarity and are switched to transition between a charging phase and a discharging phase. The transistors in the second bridge are active to define a second polarity and also are switched to transition between a charging phase and a discharging phase.

One advantage of the energy recovery circuit of this invention is that the switching action used for pumping energy into and out of the EL device allows smaller units of energy to be controlled. Previously discharge energy was recovered in one large burst according to resistive-capacitive-inductive ("RLC") timing constants in resonant tank circuits. According to this invention, however, energy is pumped incrementally based on switching action. The switching scheme allows smaller energy storage devices to be used achieve energy recovery than required for conventional resonant tank energy recovery circuits. The smaller components in turn enable the energy recovery circuit of this invention to be implemented in very small hand-held portable devices.

Another advantage of the energy recovery circuit of this invention is a reduced power consumption. Reduced power consumption is particularly beneficial for EL panels used with portable computing devices. As the panel is powered by battery, it operates for a longer time period before the battery needs to be recharged.

Another advantage of the energy recovery circuit is that less heat is generated in powering an EL device. Thus the need to provide cooling mechanisms is reduced. Reduced cooling requirements means a lighter weight panel may be achieved and that the panel can be used in higher temperature environments.

Another advantage of the energy recovery circuit is that effective steady state currents in the EL drive circuit are reduced.

The invention will be better understood by reference to the following detailed description taken in conjunction with the accompanying drawings.

DESCRIPTION OF SPECIFIC EMBODIMENTS

Overview

Figure 1:
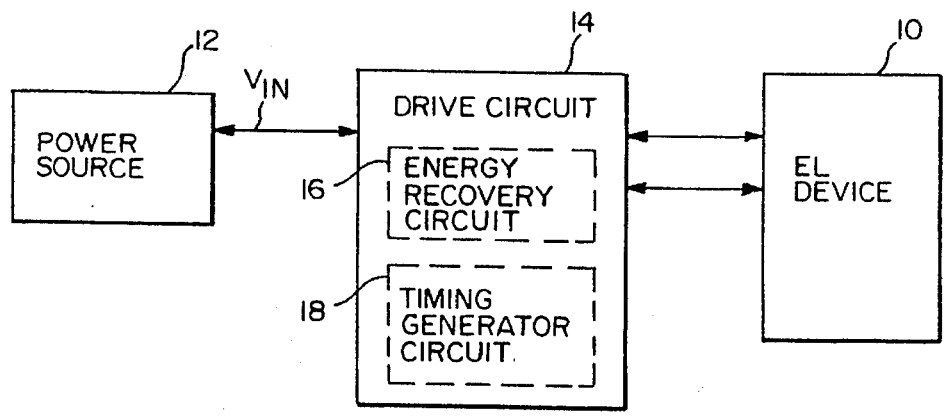
FIG. 1 is a block diagram of an electroluminescent device and power source according to an embodiment of this invention.

FIG. 1 shows a block diagram of an electroluminescent ("EL") device 10, power source 12 and drive circuit 14 according to an embodiment of this invention. The EL device 10 is an electroluminescent panel, electroluminescent lamp or other electroluminescent lighting device. Such EL devices 10 are capacitive in nature. The power source 12 supplies a dc input voltage signal, $V_{in}$, to the drive circuit 14. The drive circuit 14 receives the voltage signal and drives the EL device 10 to alternating high and low potentials at reversing polarity to generate light.

The drive circuit 14 includes an energy recovery circuit 16 and a timing generator circuit 18. The energy recovery circuit 14 receives the input voltage signal, $V_{in}$, and generates an alternating polarity power input signal to the EL device 10 based upon timing signals provided by the timing generator circuit 18. For each polarity of the power cycle there is a charging phase and discharging phase. The EL device 10 is charged to a high potential at one polarity, then discharged to a low potential. The polarity then reverses and the device 10 is charged to a high potential at the opposite polarity. The device 10 then discharges to a low potential and the polarity again reverses to begin a new power cycle.

The EL device 10 repeatedly is charging and discharging during operation. During a charging phase, a portion of input energy is absorbed by the device 10, a portion is dissipated as heat and a portion is converted to light. During a discharging phase, the previously absorbed energy is released. The function of the power recovery circuit is to absorb a portion of the released energy for re-use during a subsequent charging phase. The more energy recovered in this way, the more efficient are the EL panel 10 and related drive circuitry 14. By recovering energy for-reuse, the net input from power source 12 is reduced, thereby reducing the power consumption of the EL device 10.

Energy Recovery Circuit

Figure 2:
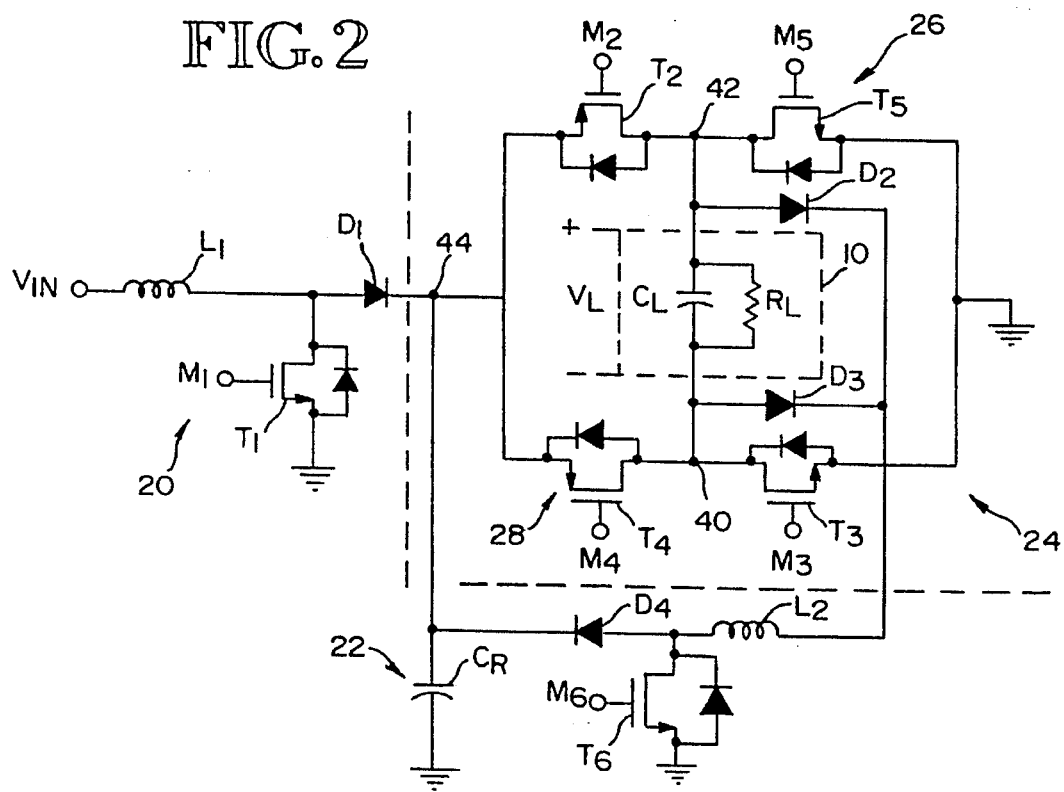
FIG. 2 is a schematic diagram of the energy recovery circuit and EL device of FIG. 1 according to an embodiment of this invention.

FIG. 2 shows a schematic diagram of the energy recovery circuit 16 with EL device 10 according to a preferred embodiment of this invention. The EL device 10 is represented electrically by its characteristic load capacitance, $C_l$, and load resistance, $R_L$. During an energy charging phase, the device 10 receives energy. A portion of the received energy is stored in the device 10 due to its load capacitance $C_L$. Another portion is converted to light.

During an energy discharging phase, capacitive energy stored in the device 10 (e.g., $C_L$) is discharged. A portion of this discharged energy is dissipated as heat via the device's load resistance, $R_L$. The function of the energy recovery circuit 16, however, is to re-absorb a portion of this discharged capacitive energy, thereby reducing the portion dissipated as heat. Such re-absorbed energy then is re-applied to the device 10 during a subsequent charging phase. As a result, the power drawn from the source 12 to power the EL device 10 is reduced. The EL device 10, in effect, becomes more efficient when coupled with the energy recovery circuit 16.

The energy recovery circuit 16 includes a charging pump stage 20, a recovery pump stage 22, and a bridge stage 24. The charging pump stage 20 pumps energy from power source 12 into the EL device 10 during a charging phase. The recovery pump stage 22 absorbs load capacitance $C_L$ discharge energy during the discharging phase and inputs a portion of that absorbed energy back into the EL device 10 during a subsequent charging phase. The bridge stage 24 defines a power cycle controlling the polarity of energy input to the EL device 10 and the charging and discharging phase transitions.

The charging pump stage 20 includes an inductor $L_1$, diode $D_1$, and switching transistor $T_1$. The inductor $L_1$ receives the dc voltage input signal $V_{in}$ from power source 12. Energy then is pumped from the inductor $L_1$ to the EL device 10 by transistor $T_1$. By switching transistor $T_1$ on and off, the inductor $L_1$ is cyclically loaded and released. Diode $D_1$ prevents current from traveling back into the booster stage 20 during discharging phases.

The recovery pump stage 22 includes an inductor $L_2$, a switching transistor $T_6$, a diode $D_4$, and a recovery capacitor $C_R$. During a discharge phase of the power cycle, the EL device 10 load capacitance $C_L$ is discharged. A portion of this discharged energy is dissipated by load resistance $R_L$. A significant portion, however, flows to inductor $L_2$. The energy is pumped from inductor $L_2$ to a recovery capacitor, $C_R$, for storage. Transistor $T_6$ periodically switches on and off during this discharge phase to pump the energy through the inductor $L_2$ into capacitor $C_R$. During the next charging phase of the power cycle, the recovery capacitor, $C_R$, discharges its energy to flow back into the EL device 10. Thus, during a charging phase, the EL device 10 receives energy from both the charging pump stage 20 (e.g., inductor $L_1$) and the recovery pump stage 22 (e.g., capacitor $C_R$).

The bridge stage 24 includes a first bridge 26, a second bridge 28 and diodes $D_2$ and $D_3$. When the first bridge 26 is active, second bridge 28 is inactive. Similarly, when second bridge 28 is active, first bridge 26 is inactive. When first bridge 26 is active, energy flow into the EL device 10 is at one polarity. When second bridge 28 is active, energy flow into EL device 10 is at the opposite polarity. When neither bridge 26, 28 is active, the EL device is isolated. The first bridge 26 is formed by transistors $T_2$ and $T_3$. The second bridge 28 is formed by transistors $T_4$ and $T_5$.

In one embodiment the switching devices $T_1$–$T_6$ are formed by power FETs having intrinsic body diodes. These body diodes are shown across the source and drain of each transistor in FIG. 2. The body diodes of transistors $T_3$ and $T_5$ provide a return path for EL device discharge current while the switching transistors $T_2$–$T_5$ of the first and second bridges 26, 28 are off. In an alternate embodiment only the transistors $T_3$ and $T_5$ have body diodes. In still another embodiment, transistors $T_3$ and $T_5$ do not have body diodes, but instead have high efficiency schottky diodes across their respective source and drain contacts.

Power Cycle and Timing

Figure 3:
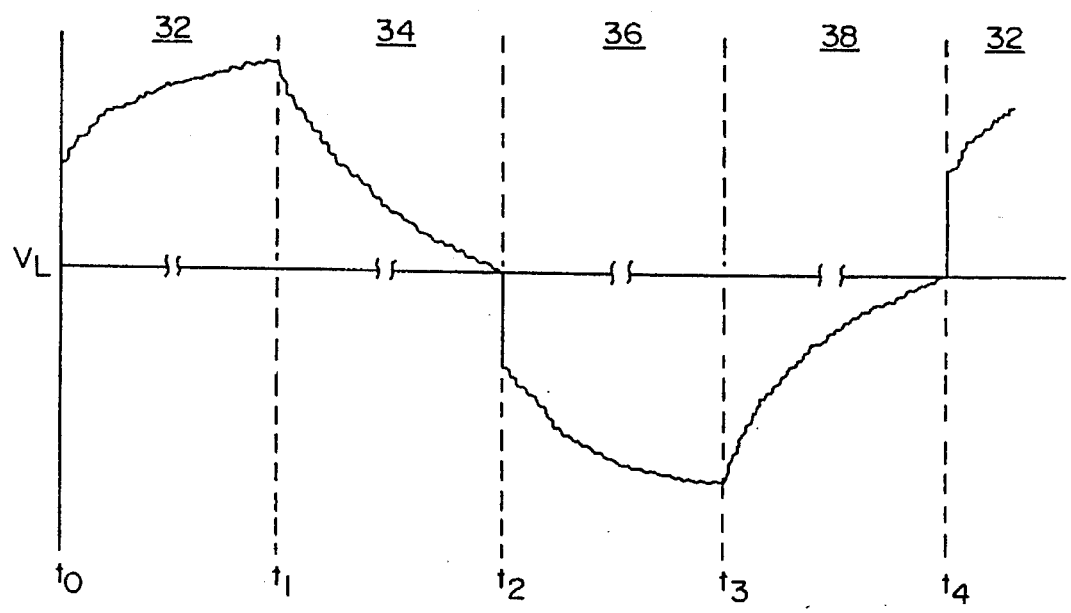
FIG. 3 is a chart of panel voltage over the charging and discharging phases of the power cycle using the energy recovery circuit of FIG. 2.
Figure 4:
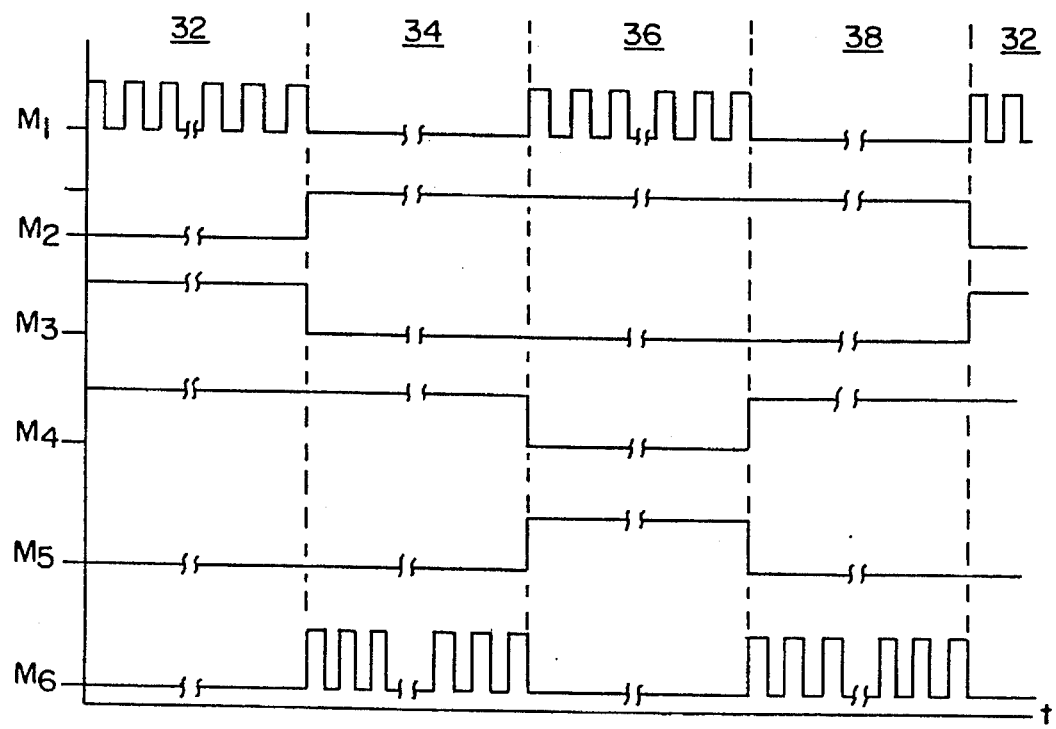
FIG. 4 is a timing diagram showing transistor states for energy recovery circuit components at various times during the power cycle.

FIG. 3 shows the voltage signal, $V_L$, across the EL device 10 over the power cycle. The power cycle includes a charging phase 32 and a discharging phase 34 at a first polarity, followed by a charging phase 36 and discharging phase 38 at the opposite polarity. FIG. 4 shows a timing diagram of the switching transistor $T_1$–$T_6$ states for the charging and discharging phases 32–38.

Charging and discharging phases of the EL device are defined by toggling bridge 26 or 28 switching transistors. During a charging phase at one polarity, transistors $T_2$ and $T_3$ are on and transistors $T_4$ and $T_5$ are off. During the discharging phase of the same polarity, transistors $T_2$, $T_3$, $T_4$ and $T_5$ are off. During the subsequent charging phase at the opposite polarity, transistors $T_2$ and $T_3$ are off and transistors $T_4$ and $T_5$ are on. During the discharging phase of such opposite polarity, transistors $T_2$, $T_3$, $T_4$ and $T_5$ are off. When transistors $T_2$ through $T_5$ are off, the load device 10 is isolated. When transistor $T_6$ switches on a low potential forward biases the diode $D_2$ or $D_3$ (depending on the polarity) providing a discharge path. The load 10 discharges through diode $D_2$ or $D_3$ while transistor $T_6$ is on. The body diodes of transistors $T_3$ and $T_5$ provide the return path for the discharge current. By switching transistor $T_6$ on and off, the load capacitance $C_L$ discharges to inductor $L_2$ in small energy portions.

The charging phase 32 at a first polarity (e.g., positive) begins at time $t_0$. At time $t_0$ signal $M_1$ becomes active cyclically switching the transistor $T_1$ on and off. While on, inductor $L_1$ passes a small portion of the input voltage $V_{in}$ energy from the power source 12 to the load 10 via bridge 26 or 28 to develop a load voltage, $V_L$. A portion of the incoming energy is stored in the load capacitance $C_L$. Another portion is converted to light.

As shown in FIG. 4, signals $M_2$ and $M_5$ are low and signals $M_3$ and $M_4$ are high during the charging phase 32. Thus, the first bridge 26 is active. Transistor $T_3$ puts node 40 near ground potential and transistor $T_2$ puts node 42 at a high potential. The incoming energy is pumped through the first bridge 26 to the EL panel 10 to build the load voltage $V_L$ to a high potential at a first polarity (e.g., positive). FIG. 3 shows the incremental rise in voltage, $V_L$, across the EL load 10 during phase 32. Each step-like increase in voltage, $V_L$, corresponds to the energy pumped from inductor $L_1$ during one switching period of signal $M_1$.

The shape of signal $V_L$ during the charging phase 32 is determined by the inductor $L_1$ timing constant, the signal $M_1$ frequency, and the load capacitance $C_l$ timing constant. The step-like increments in $V_L$ are determined by the inductor $L_1$ timing constant and the signal $M_1$ frequency.

The discharging phase 34 begins at time $t_1$. During the discharging phase 34, signal $M_1$ is kept low preventing energy from flowing from the charging pump stage 20 to the EL panel 10. Signal $M_2$ switches high and signal $M_3$ switches low so that transistors $T_2$–$T_5$ are off isolating the load 10. Whenever $T_6$ switches on, diode $D_2$ is forward biased forcing the panel to discharge toward a lower potential. The run-off current enters inductor $L_2$. Transistor $T_6$ pumps the current from the inductor $L_2$ through diode $D_4$ charging the recovery capacitor $C_R$. FIG. 3 shows the incremental lowering of voltage across the EL device 10 during phase 34 due to the pumping action. FIG. 4 shows the switching of transistor $T_6$ triggering the pumping action. The shape and step-like decrements in $V_L$ are determined by the inductor $L_1$ timing constant, the signal $M_1$ frequency and the load capacitance $C_L$ timing constant.

The next charging phase 36 begins at time $t_2$. During the charging phase 36, signal $M_6$ is held low keeping the transistor $T_6$ off so no more energy flows through the inductor $L_2$ into capacitor $C_R$. Also, signal $M_4$ is switched low and signal $M_5$ is switched high so that transistors $T_4$ and $T_5$ are on and transistors $T_2$ and $T_3$ are off. This activates the second bridge 28 jumping node 40 to a first potential as capacitor $C_R$ discharges. Diode $D_4$ keeps the discharge energy from flowing as current back toward inductor $L_2$. The current flows to node 44 and into the EL panel 10. Node 44 increases its voltage potential magnitude as energy is received from both the inductor $L_1$ and the capacitor $C_R$.

With the second bridge 28 active, the energy flow from node 44 to nodes 40 and 42 puts node 40 at a high potential and node 42 at a low potential. Thus, the energy from node 44 flows in the reverse direction to the EL panel 10 compared with the flow during the charging phase 32. The EL panel 10 is brought to a high potential, $V_L$, at the opposite polarity (e.g., negative). FIG. 3 shows the incremental rise in voltage during phase 36 due to the pumping action. FIG. 4 shows the switching of transistor $T_1$ triggering the pumping action. The shape and step-like decrements in signal $V_L$ are determined by the inductor $L_1$ timing constant, the signal $M_1$ frequency and the load capacitance $C_L$ timing constant.

The next discharging phase 38 begins at time $t_3$. During the discharging phase 38, signal $M_1$ is kept low preventing energy from flowing from the charging pump stage 20 to the EL panel 10. Signal $M_4$ switches high and signal $M_5$ switches low so that transistors $T_2$–$T_5$ are off isolating the load 10. Whenever $T_6$ switches on, diode $D_3$ is forward biased forcing the panel to discharge toward a lower potential. The run-off current enters inductor $L_2$. Transistor $T_6$ pumps the current from the inductor $L_2$ through diode $D_4$ charging the recovery capacitor $C_R$. FIG. 3 shows the incremental lowering of voltage magnitude across the EL device 10 during phase 38 due to the pumping action. FIG. 4 shows the switching of transistor $T_6$ triggering the pumping action. The shape and step-like decrements in $V_L$ are determined by the inductor $L_1$ timing constant, the signal $M_1$ frequency and the load capacitance $C_L$ timing constant.

The next power cycle then begins with a charging phase 32. Signal $M_6$ is held low keeping the transistor $T_6$ off so no more energy flows through the inductor $L_2$ into capacitor $C_R$. Also, signal $M_2$ is switched low and signal $M_3$ is switched high so that transistors $T_2$ and $T_3$ are on and transistors $T_4$ and $T_5$ are off. This activates the first bridge 26 jumping node 42 to a first potential as capacitor $C_R$ discharges. Diode $D_4$ keeps the discharge energy from flowing as current back toward inductor $L_2$. The current flows to node 44 and into the EL panel 10. Node 44 increases its voltage potential magnitude as energy is received from both the inductor $L_1$ and the capacitor $C_R$.

As previously described signal $M_1$ switches transistor $T_1$ on and off to pump energy from the inductor $L_1$ to the EL panel. Energy flow from node 44 to nodes 40 and 42 puts node 42 at a high potential and node 40 at a low potential. Thus, the energy from node 44 flows in the reverse direction to the EL panel 10 compared with the flow during charging phase 36. The EL panel 10 thus is brought to a high potential, $V_L$, at the first polarity (e.g., positive).

The power cycle repeats with energy being pumped to the EL panel 10 during charging phases 32, 36 and non-dissipated energy being recovered from the EL panel 10 during discharge phases 34, 38. During each charging phase, energy is supplied from the power source 12 via charging pump stage 20 and from the recovery capacitor $C_R$ of the recovery pump stage 22.

Each incremental step in voltage, $V_L$, during charging phases 32, 36 corresponds to the switching period of signal $M_1$. Similarly, each decremental step in voltage, $V_L$, during discharging phases 34, 38 corresponds to the switching period of signal $M_6$.

Timing Generator circuit

Figure 5:
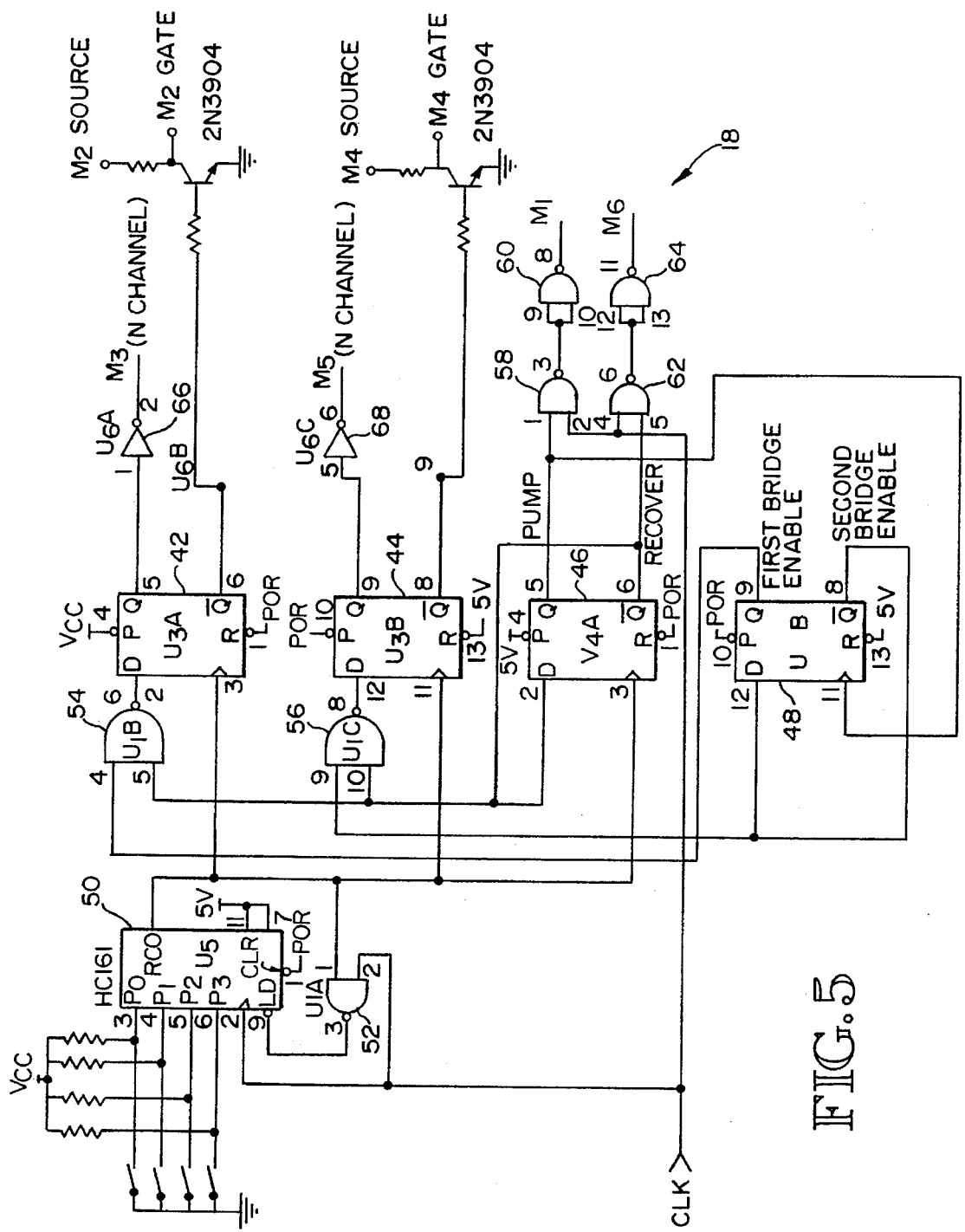
FIG. 5 is a schematic diagram of a timing generator circuit for controlling switching within the energy recovery circuit of FIG. 2.

FIG. 5 shows a schematic diagram of a circuit 18 embodiment for generating the timing signals $M_1$ through $M_6$ of FIG. 4. The circuit 18 includes several D flip-flops 42, 44, 46, 48, a counter 50 and several NAND gates 52–64 and inverters 66, 68. A clock signal is input to a set of NAND gates 58–64 for generating signals $M_1$ and $M_6$. The clock signal also is input to the counter 50 to transition every X number of clock pulses. X defines the number of $T_1$ switches during a charging phase 32, 36 or the number of $T_6$ switches during a recovery phase. In an alternate embodiment separate counters are used to define the number of $T_1$ switches and $T_6$ switches so that the number of switching periods X in the charging phase may vary with a number Y in a discharging phase.

Every counter 50 transition marks a phase change (e.g., phase 32 to phase 34) in the power cycle. Flip-flop 48 is toggled every two counter transitions to enable the first bridge (transistors $T_2$, $T_3$) or the second bridge (transistors $T_4$, $T_5$). Flip-flop 46 is toggled every counter transition to switch between a charging phase and a discharging phase. Flip-flop 42 is driven by flip-flop 48 when the first bridge is active. Flip-flop 44 is driven by flip-flop 48 when the second bridge is active.

Although the embodiment for the timing generator circuit 18 is depicted with discrete components, in a preferred embodiment, timing circuitry is formed on an integrated circuit. Any of many alternative logic formations are implemented on the IC to achieve the timing pattern of FIG. 4.

Alternative Embodiments

For a best mode embodiment, the energy recovery circuit 16 and timing generator circuit 18 are formed on a common integrated circuit designed to minimize parasitic effects. In particular, parasitic capacitances and inductances attributable to high frequency switching action are greatly minimized by a common IC tuned for a specific switching frequency range. Note that low-profile inductors and capacitors are formed off-chip.

For a given EL panel 10 energy recover circuit 16 values are selected based on a desired switching frequency range. Different values are preferred for different frequency ranges to best tune out parasitic effects of the transistors $T_1$ to $T_6$.

In one embodiment inductors $L_1$ and $L_2$ are formed by discrete inductive coils or other inductive structures. In one embodiment capacitor $C_R$ is formed by a capacitor or other capacitive structure. In one embodiment the diodes $D_1$–$D_4$ are formed by diodes or other diode-like structures (e.g., transistor wired as diode). In an IC embodiment the diodes preferably are formed by diode or diode-like structures integral to the IC. In one embodiment switches $T_1$–$T_6$ are FET transistors operated as switching devices, although other switching transistors or switching devices also may be used. In an IC embodiment devices $T_1$–$T_6$ are switching structures integral to the IC chip. Such switching structures may be transitive structures or other switching structures. The structures implemented for circuit 16 components also may vary depending on the IC technology.

In the preferred embodiment, pumping occurs during the entire charging phase or discharging phase. In alternate embodiments, however, pumping may occur over a portion of the charging or discharging phase. In various embodiments, the number of switching periods in a charging phase may be the same or differ from the number of switching periods during a discharging phase.

Problem and Means for Solving Problem

This invention addresses the problem of power inefficiencies in EL devices. To make EL device usage more efficient, energy is recovered from the EL device during discharge. As EL devices are capacitive in nature, such devices are powered by charging the device to a high potential, then discharging the device to a low potential. Only a small portion of such energy input to the device, however, is used to generate light. It is therefore desirable to recover some of the energy during discharge and re-use to charge the EL device during a subsequent charging period.

While prior solutions have performed energy recovery using resonant tank circuits, the solution of this invention is to provide a switching scheme for pumping energy into and out of the EL device. By using a switching scheme energy is moved in smaller units. Conventional resonant tank circuits absorb discharge energy and re-enter the energy into the EL device based upon the timing constants of the capacitive and inductive components of the EL device and resonant tank. Such components are comparatively larger than for the inventive circuit making the resonant tank approach impractical for implementation in small hand-held devices.

The switching scheme of this approach uses transistors to define a power cycle, trigger charging and discharging phases, and pump energy in and out of the EL device. The pump stages include inductors which pump energy in smaller amounts than the EL load capacitance freely discharges.

Meritorious and Advantageous Effects

One advantageous effect of the energy recovery circuit of this invention is that the switching action used for pumping energy into and out of the EL device allows smaller units of energy to be controlled. The switching scheme allows smaller components to achieve energy recovery, as compared to components required by conventional resonant tank energy recovery circuits. An effect of the smaller components is that the energy recovery circuit of this invention is easily implemented in very small devices.

Another advantageous effect of the energy recovery circuit of this invention is a reduced power consumption. Reduced power consumption is particularly beneficial for EL panels used with portable computing devices. As the panel is powered by battery, it operates for a longer time period before the battery needs to be recharged.

Another advantageous effect of the energy recovery circuit is that less heat is generated in powering an EL device. Thus the need to provide cooling mechanisms is reduced. Reduced cooling requirements means a lighter weight panel may be achieved and that the panel can be used in higher temperature environments.

Another advantageous effect of the energy recovery circuit is that effective steady state currents in the EL drive circuit are reduced.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. An energy recovery circuit for powering an EL device, comprising:

a first inductor coupled to the EL device and receiving a voltage signal from a power source, the first inductor storing energy from the power source;

a first switch coupled to the first inductor for pumping energy from the first inductor to the EL device to charge the EL device;

a second inductor coupled to the EL device and receiving EL device discharge energy;

a second switch coupled to the second inductor;

a first capacitor coupled to the second inductor and the EL device;

the second switch for pumping EL device discharge energy from the second inductor to the first capacitor while the EL device is discharging;

the first capacitor storing pumped discharge energy, then releasing the stored discharge energy into the EL device to charge the EL device.

2. The energy recovery circuit of claim 1, further comprising:

a first bridge and a second bridge formed across the EL device, the first inductor coupled to the EL device via the first bridge and second bridge, the first bridge and second bridge receiving timing signals for defining a power cycle, the power cycle having a charging phase and discharging phase at one polarity followed by a charging phase and a discharging phase at an opposite polarity; and wherein the first switch pumps energy from the first inductor to the EL device and the first capacitor releases discharge energy into the EL device during charging phases of the power cycle; and wherein the second switch pumps EL device discharge energy from the second inductor to the first capacitor during discharging phases of the power cycle.

3. The energy recovery circuit of claim 2, in which the first bridge comprises a first transistor and a second transistor coupled to the EL device as an electrical bridge.

4. The energy recovery circuit of claim 3, in which the second bridge comprises a third transistor and a fourth transistor coupled to the EL device as an electrical bridge.

5. An energy recovery circuit for powering an EL device, comprising:

a first stage for receiving a voltage signal from a power source, the first stage comprising a first inductor and a first switch, the first inductor receiving the voltage signal and storing energy, the first switch pumping energy from the first inductor to the EL device during charging phases of an EL device power cycle;

a first bridge and a second bridge formed across the EL device and coupled to the first stage, the first bridge and second bridge receiving timing signals for defining the EL device power cycle, the power cycle having a charging phase and discharging phase at one polarity followed by a charging phase and a discharging phase at an opposite polarity;

a second stage for receiving EL device discharge energy, the second stage coupled to the first bridge and second bridge and to the EL device, the second stage comprising a second inductor, a second switch and a first capacitor, the second inductor coupled to the EL device and receiving EL device discharge energy, the second switch pumping EL device discharge energy from the second inductor to the first capacitor during discharging phases of the power cycle, the first capacitor storing the pumped discharge energy during discharging phases and releasing the stored energy into the EL device via the first bridge or second bridge during a charging phase.

6. The energy recovery circuit of claim 5, in which the first bridge comprises a first transistor and a second transistor coupled to the EL device as an electrical bridge, and in which the second bridge comprises a third transistor and a fourth transistor coupled to the EL device as an electrical bridge.

7. The energy circuit of claim 6 in which respective first, second, third and fourth transistors receive respective first, second, third and fourth timing signals for defining the EL device power cycle.

8. A method of charging and discharging an EL device during a power cycle, comprising the steps of:

charging the EL device by transferring a sequence of discrete energy portions from a power source to the EL device during a power cycle charging phase to incrementally accumulate a high energy potential across the EL device; and discharging the EL device by transferring a sequence of discrete discharge energy portions from the EL device and accumulating discrete discharge energy portions discharged from the EL device at a capacitor during a power cycle discharging phase to incrementally recover energy from the EL device; and wherein the step of charging further comprises discharging the capacitor into the EL device during the power cycle charging phase.

9. The method of claim 8 in which the step of transferring a sequence of discrete energy portions from the power source, comprises the steps of:

storing energy from the power source at a first inductor;

releasing the stored energy to the EL device; and repeating the storing and releasing steps during a charging phase of the power cycle.

10. A method of charging and discharging an EL device during a power cycle, comprising the steps of:

charging the EL device by transferring a sequence of discrete energy portions from a power source to the EL device to incrementally accumulate a high energy potential across the EL device; and discharging the EL device by transferring a sequence of discrete discharge energy portions from the EL device and capturing the sequence of discrete energy portions from the EL device at a capacitor; the step of capturing comprising the steps of:

storing a discharge energy portion from the EL device at a second inductor;

releasing the stored discharge energy portion to the capacitor; and repeating the storing and releasing steps during a discharging phase of the power cycle; and wherein the step of charging further comprises discharging the capacitor into the EL device.

11. The method of claim 10 in which the step of transferring the sequence of discrete energy portions from the power source, comprises the steps of:

storing energy from the power source at a first inductor;

releasing the stored energy to the EL device; and repeating the storing and releasing steps during a charging phase of the power cycle.

12. The method of claim 11, in which a first bridge and a second bridge are formed across the EL device, the first inductor coupled to the EL device via the first bridge and second bridge, and further comprising the step of:

receiving timing signals at the first bridge and second bridge for defining a power cycle, the power cycle having a charging phase and discharging phase at one polarity followed by a charging phase and a discharging phase at an opposite polarity.

* * * * *